United States Patent
Tayloe et al.

[11] Patent Number: 5,974,316
[45] Date of Patent: Oct. 26, 1999

[54] SYSTEM AND METHOD FOR ENHANCING RING ALERT TERMINATIONS

[75] Inventors: Daniel Richard Tayloe, Phoenix; Nathan West Miller, Tempe; Kenneth Lee Sowles; Robert Frederick, both of Chandler, all of Ariz.

[73] Assignee: Motorola, Inc., Schaumburg, Ill.

[21] Appl. No.: 08/777,160

[22] Filed: Dec. 26, 1996

[51] Int. Cl.⁶ .................................................. H04Q 7/20
[52] U.S. Cl. .................. 455/429; 455/12.1; 455/427; 455/509; 455/512
[58] Field of Search .................. 455/12.1, 13.1, 455/13.3, 427–429, 436, 450, 452, 509, 512, 517; 342/354, 357

[56] References Cited

U.S. PATENT DOCUMENTS

| | | | |
|---|---|---|---|
| 5,367,304 | 11/1994 | Jan et al. | 455/427 |
| 5,463,400 | 10/1995 | Tayloe | 455/427 |
| 5,490,087 | 2/1996 | Redden et al. | 455/427 |
| 5,539,921 | 7/1996 | Tayloe | 455/427 |
| 5,774,806 | 6/1998 | Tayloe et al. | 455/427 |
| 5,790,951 | 8/1998 | Tayloe | 455/427 |
| 5,887,257 | 3/1999 | Olds | 455/12.1 |

*Primary Examiner*—Dwayne D. Bost
*Assistant Examiner*—Nay A. Maung
*Attorney, Agent, or Firm*—Walter W. Nielsen; Frank J. Bogacz

[57] ABSTRACT

A communication system including a constellation of satellites and a multi-channel unit having a plurality of co-located transceivers operative for exchanging communication information with users, and for monitoring a plurality of spot beams transmitted from one or more of the satellites for ring alert data contained within broadcast channels, and for monitoring and prioritizing the strongest of "n" broadcast channels for ring alerts based upon signal strength, upon a continuous sampling of ring alert channels contained within one or more broadcast channels, upon broadcast signal strength in relation to idle transceiver availability and the communication system geometries, and upon the monitoring of broadcast channels contained within candidate handoff lists contained within one or more of the traffic channels of in-use transceivers, for the purpose of increasing the probability of receiving a ring alert.

25 Claims, 3 Drawing Sheets

SYSTEM AND METHOD FOR ENHANCING RING ALERT TERMINATIONS

BACKGROUND OF THE INVENTION

This invention relates generally to the field of wireless communications and, more particularly, to the field of ring alert terminations in a wireless communication system.

Digital wireless communication systems employ synchronous or asynchronous transmission protocols. Synchronous transmission protocols require rigid timing and structure of transmissions between communication elements. Typically, one communication element will be designated as a node, reference or origin communication element, for example as at least one satellite of a constellation of satellites. Other non-reference communication elements, such as individual subscriber units (ISUs), operating within the communication system must adhere to the timing and frequencies established by the reference communication element.

A reference communication element transmits information, such as ring alert data, in order to attempt to connect a call to an ISU, consistent with the timing and frequency established within the communication system. Ring alert data is normally carried within broadcast channels directed along a beam transmitted by one or more reference communication elements.

A user with an ISU is normally located in an area having a clear line of sight view of the satellite of a constellation of satellites (normally referred to as SV constellation). In this environment, the ISU has about a 90% chance of successfully terminating a call. Typically, each reference communication element uses a series of small spot beams which move across the face of the earth. The use of small spot beams helps increase frequency reuse in the communication system and therefore allows for greater capacity for the limited spectrum available.

Small spot beams also necessitate that ring alert signals be transmitted via several spot beams in order to cover an area that an ISU can be in. In other words, a plurality of broadcast channels located within a predetermined number of spot beams issue a ring alert signal or transmission indicating a pending call.

However, most of the time, an ISU is in standby mode. When an ISU is in standby mode, it normally rescans for the strongest beam for monitoring ring alerts as infrequently as possible (normally every 60 seconds) in order to conserve battery power, because frequent rescans reduce the available standby battery life, and because ring alerts can be lost during the rescan process.

In like manner, an ISU can originally pick a beam which is optimum for receiving a ring alert at the time of the rescan. However, because the reference communication element is normally moving with respect to the earth, and because the ISU can also be moving upon the face of the earth, such as in a car, train, or airplane, this beam will become progressively less optimum as time goes by.

As a result, when an ISU picks a beam to monitor for ring alerts, it might not be the optimum or strongest beam because communication system resources limit the number of beams that can be economically rung at any one given time. Normally, about 4.5 beams are rung per ring alert. However, for battery conservation reasons, the ISU will hang onto a beam for so long that the system has a reasonable chance of not ringing the beam that the ISU is listening to, even when the ISU is placed in an optimum environment.

Therefore, what are needed are a system and a method for enhancing ring alert or call terminations in a communication system where the reference and nonreference communication elements are not stationary. What are also needed are a system and a method for enhancing ring alert or call terminations that maximize system resources and conserve energy.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

DETAILED DESCRIPTION OF A PREFERRED EMBODIMENT

The present invention provides, among other things, a method and a system for increasing ring alert or call terminations by monitoring, locating, and prioritizing broadcast channels having a high probability of including ring alert data intended to be received by a multi-channel unit (MXU). In a preferred embodiment, an MXU comprises a plurality of co-located communication transceivers. A single MXU is capable of handling communications with several handsets. For example, in one embodiment, one MXU handles calls directed to and made from a plurality of seat-back handsets on an airplane. Each of the transceivers associated with the MXU is capable of handling a call intended for or originating from one of a plurality of handsets associated with such transceiver. Normally when such transceiver is busy handling a call for a particular handset, it cannot handle calls to or from other handsets, but when the first call is completed, the transceiver goes idle and can handle another call to or from the same or a different handset in its group of handsets.

The MXU operates to monitor and evaluate the status of the communication transceivers within the MXU. When some of the co-located transceiver units are not in use, or idle, they can be put into use monitoring the relatively strongest "n" broadcast channels for ring alert. Because the strongest "n" broadcast channels have the highest probability of having ring alert data for the MXU, the idle co-located transceiver units can be used for listening for ring alert transmissions to issue over the strongest "n" broadcast channels.

A single transceiver unit cannot listen to all of the broadcast channels, since broadcast channels can be sent at the same instant in time, making it impossible to monitor all of them simultaneously.

Figure 1:
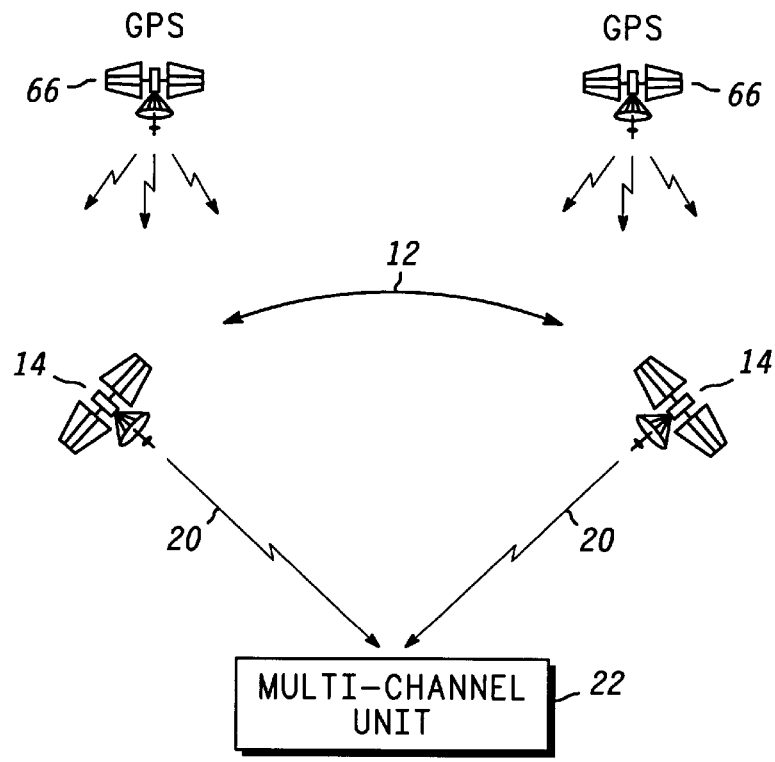
FIG. 1 illustrates a communication system for providing ring alert data to a multi-channel unit, in accordance with a preferred embodiment of the present invention.

FIG. 1 illustrates a communication system 10 for providing ring alert data to a multi-channel unit or MXU 22, in accordance with a preferred embodiment of the present invention. Reference communication elements of the communication system are represented as a constellation 12 of satellites 14. Satellites 14, only two of which are shown and each of which are normally referred to as nodes, transmit broadcast channels 20 having ring alert data to MXU 22. Satellites 14 can be in either geosynchronous or asynchronous orbits in relation to MXU 22. It will be readily understood that the ring alert data carried within broadcast channels 20 identify or denote individual subscriber units (ISUs) having pending calls. Other more specific details of MXU 22 will be readily understood by those having ordinary skill, and further details of MXU 22 will therefore not be herein specifically addressed except to the extent necessary to make a complete disclosure of the instant invention.

Figure 2:
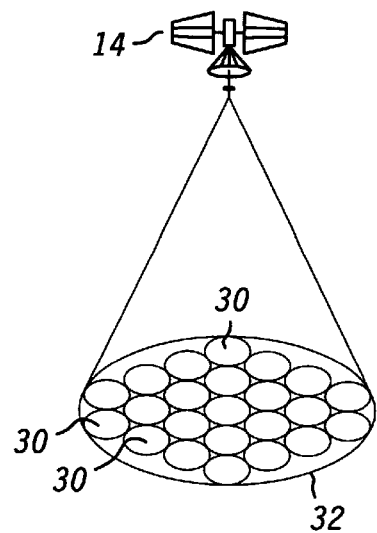
FIG. 2 illustrates a diagram of a reference communication element or node transmitting a plurality of spot beams toward the earth in an area, the spot beams being operative for transmitting broadcast channels having ring alert transmission data, in accordance with a preferred embodiment of the present invention.

As shown in FIG. 2, illustrated is a diagram of a reference communication element or node 14 transmitting a plurality of spot beams 30 toward the earth in an area, the spot beams 30 being operative for transmitting broadcast channels having ring alert transmission data, in accordance with a preferred embodiment of the present invention.

Each satellite 14 of constellation 12 emits a plurality of spot beams 30 directed toward the earth. Spot beams 30 travel across the face of the earth as the earth rotates and as the satellite moves in orbit in relation to the earth. It will be readily understood by those having ordinary skill that any given satellite can emit a selected number of spot beams each having a selected size or diameter.

With respect to a preferred embodiment, it is desirable but not essential that each satellite emit forty-eight (48) spot beams each having a diameter of preferably six hundred and fifty (650) kilometers. In order to accomplish complete coverage of the earth with each satellite 14 transmitting 48 spot beams having a preferred diameter of 650 kilometers, approximate sixty-six (66) satellites are needed to facilitate total coverage of the earth. Spot beams 30 collectively encompass an area 32 of the earth's surface when transmitted.

Sequentially transmitted within each spot beam are broadcast channels which include ring alert data or channels transmitted therein. With respect to a preferred embodiment of the present invention, it is desired but not essential that 4.5 beams are used to cover a handset at any one given time. Accordingly, selected broadcast channels transmitted within 4.5 beams normally issue a ring alert at any given time in order to ensure ring alert or call termination depending on the location of the MXU and ISU.

Figure 3:
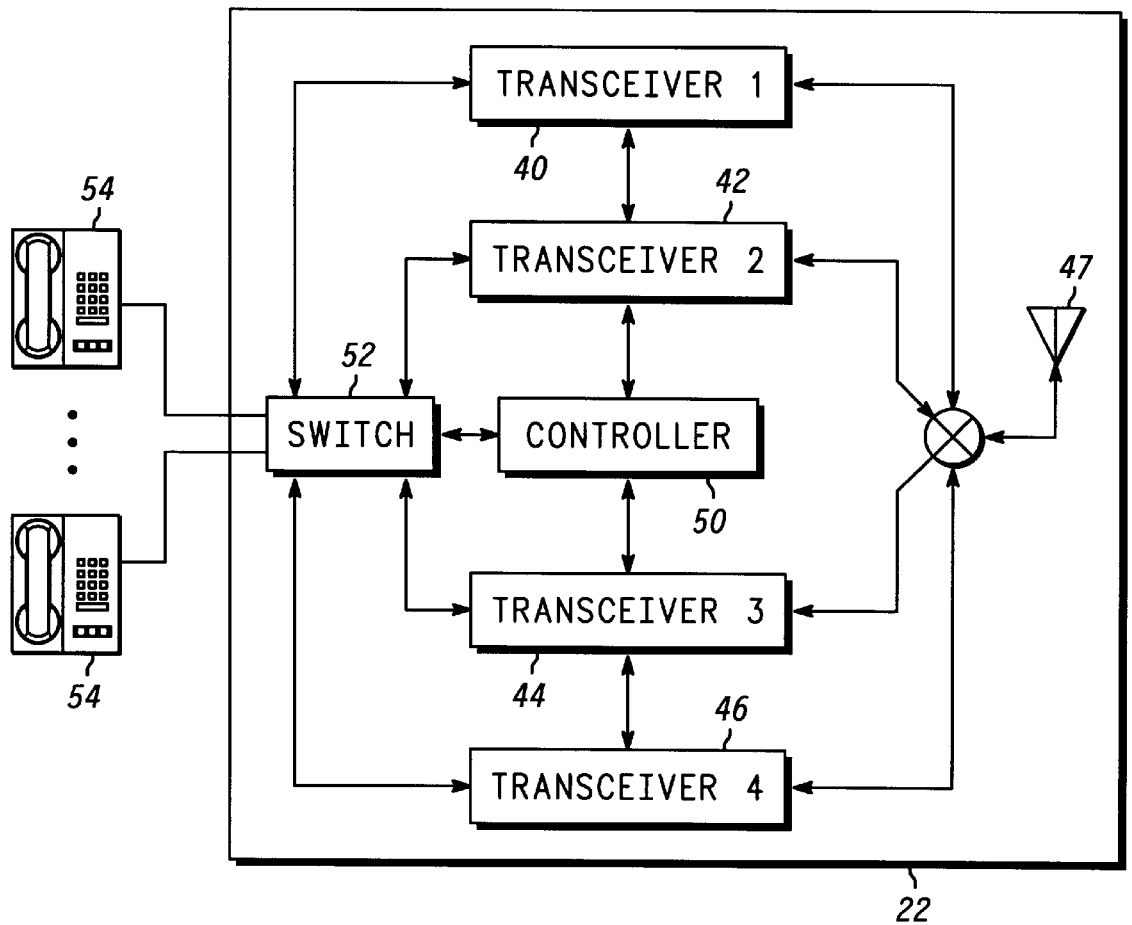
FIG. 3 illustrates a multi-channel unit shown in block diagram coupled to a group of handsets, in accordance with a preferred embodiment of the present invention.

FIG. 3 illustrates a multi-channel unit 22 shown in block diagram coupled to a group of handsets 54, in accordance with a preferred embodiment of the instant invention. While only two handsets 54 are illustrated in FIG. 3, it will be understood that a plurality of handsets 54 can be provided. MXU 22 is desirably but not essentially comprised of a plurality of co-located transceivers 40, 42, 44, and 46. It will be readily understood that any number of transceivers can be used in combination with the instant invention without departing from the nature and scope of the instant invention as herein specifically disclosed. A number of handsets 54 will normally be provided for each transceiver 40, 42, 44, and 46.

Transceivers 40, 42, 44, and 46 directly monitor broadcast channels as received through antenna 47. Transceivers 40, 42, 44, and 46 can be in use, idle, or not in use. A controller 50, coupled to transceivers 40, 42, 44, and 46, evaluates the status of transceivers 40, 42, 44, and 46, i.e., whether each is either idle or in use. A switch 52, coupled to controller 50 and transceivers 40, 42, 44 and 46, interfaces handsets 54 to transceivers 40, 42, 44 and 46 when appropriate for supporting communication in communication system 10.

For communication system 10 to function efficiently, it is important to achieve maximum ring alert or call terminations in an environment having limited system processing and power resources. Although in a typical MXU, such as MXU 22, it is occasionally possible for all of the transceivers to be in use, most of the time there are several idle transceivers. To maximize ring alert or call terminations, the idle transceivers are utilized for monitoring the strongest "n" broadcast channels and listening for ring alerts to issue over those broadcast channels. Since some, but not all, of the broadcast channels are sending ring alerts at the same instant in time, such broadcast channels need to be monitored by separate transceivers. The controller 50 manages which idle transceivers monitor which broadcast channels. However, if all transceivers are busy, the ring alert is not monitored, since there is no transceiver to assign to an incoming call.

For instance, as herein previously discussed, a typical ring alert is normally issued within an MXU-directed broadcast channel transmitted within a region of at least 4.5 spot beams 30. Idle transceivers, herein defined as transceivers 42, 44, and 46, can be put to use monitoring the spot beams within a region of 4.5 spot beams for the strongest or "n" broadcast channels and listening for ring alerts to issue over the strongest broadcast channels.

Because more than one beam is being monitored with the instant invention, the probability of listening to a beam over which a ring alert is issued increases significantly. In other words, for a system comprising only ISUs (no MXUs), at the time of a rescan an individual ISU can originally pick a single beam which is optimum for receiving a ring alert, this optimum beam will become less optimum as time goes by, which normally results in a lower probability of achieving ring alert or call termination. However, with the instant invention, because idle transceivers 42, 44, and 46, either individually or in combination with one another, are put to use monitoring the strongest "n" broadcast beams over a specified and predetermined region of spot beams, the probability of missing a ring alert termination is considerably lower.

Depending on system resources, it is also possible for one or more of the idle transceivers 42, 44, and 46 to prioritize broadcast channels based on the predicted signal strength of the broadcast channels and upon the probability that a ring alert will issue over a specific broadcast channel. If the MXU knows where it is with respect to the space vehicle beams, and if it knows the beam configuration, it can predict the "best coverage" beams to listen to.

Figure 4:
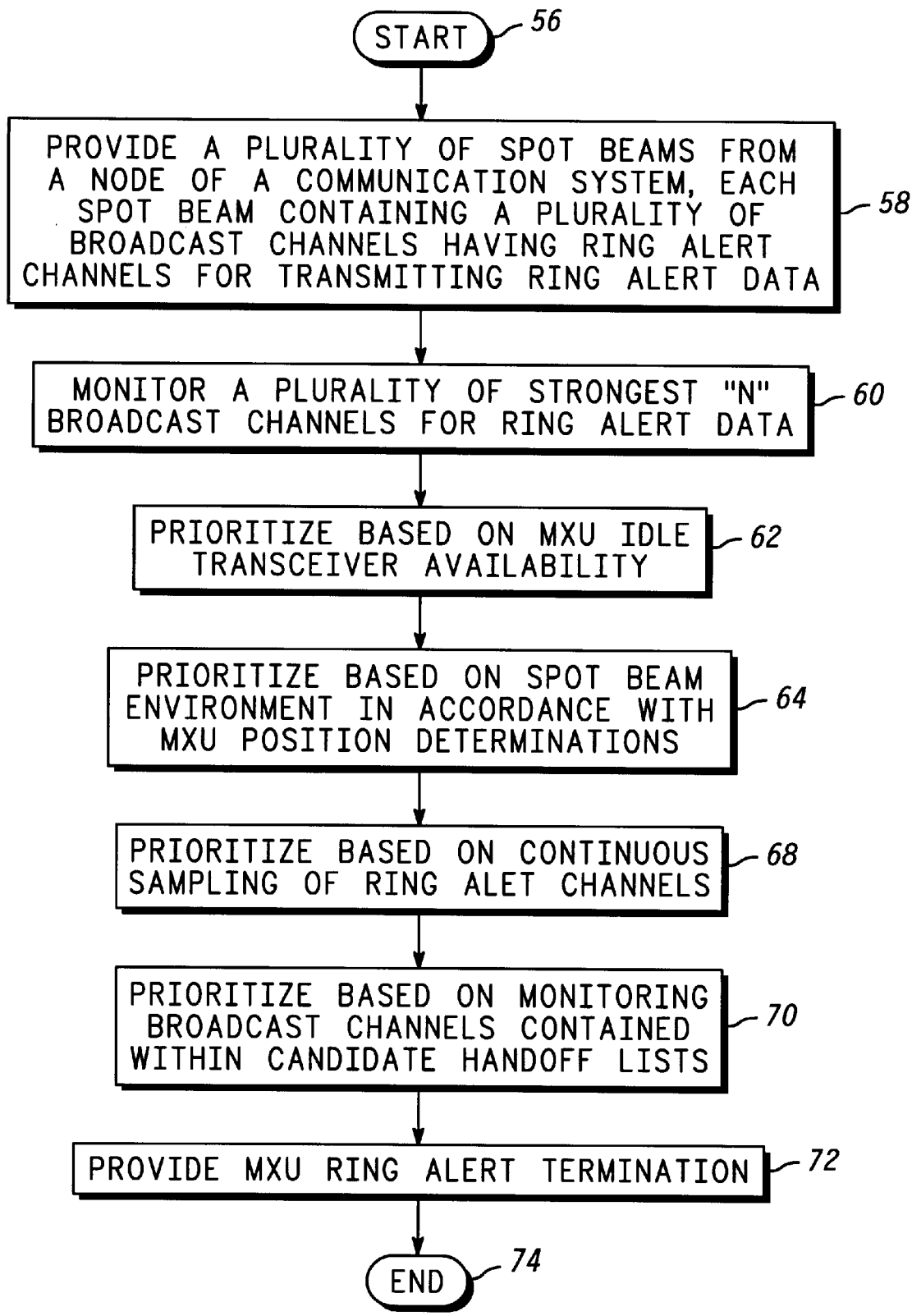
FIG. 4 is a flowchart illustrating a method for locating the relatively strongest broadcast channels within a region of spot beams with one or more idle co-located transceivers in order to increase the ring alert or call termination rate in a communication system, in accordance with a preferred embodiment of the present invention.

FIG. 4 is a flowchart illustrating a method for locating the relatively strongest broadcast channels within a region of spot beams with one or more idle co-located transceivers in order to increase the ring alert or call termination rate in a communication system, in accordance with a preferred embodiment of the present invention. In particular, FIG. 4 shows how an MXU can utilize one or more idle transceivers to not only monitor the strongest "n" broadcast channels, but also to prioritize the strongest "n" broadcast channels based on the probability of the issuance of a ring alert.

The method begins in box 56 in FIG. 4. In task 58, satellite 14 (FIG. 1) of constellation 12 of communication system 10 transmits spot beams to the earth containing broadcast channels for transmitting ring alert data.

Idle transceivers 42, 44, and 46 of MXU 22, either individually or in combination with one another, perform a task 60 monitoring the strongest "n" broadcast channels within a region proximate to 4.5 spot beams listening for ring alerts to issue, thereby increasing the probability of ring alert termination. Due to the importance of achieving increased ring alert termination, broadcast channels occurring within a region can be prioritized based on the predicted signal strength of the broadcast channels within the region and upon the probability that a ring will issue over a specified broadcast channel.

Next in task 62, the broadcast channels are prioritized based on the degree of MXU idle transceiver availability. In particular, when there are a large number of idle transceivers, a correspondingly large number of broadcast channels of varying frequency can be monitored within a given region. However, when the number of idle transceivers is low, only a subset of the strongest "n" broadcast channels can be monitored consistent with the number of available transceivers. In his manner, the broadcast channels are prioritized based on the relative strength of the signal and in relation to he number of idle transceivers available.

Prioritization of broadcast channels can also be performed by one or more idle transceivers by means of a task 64, in which the strongest "n" broadcast channels are prioritized based upon system geometries which correspond to the spot beam environment in accordance with MXU position determinations. In particular, a given MXU, such as MXU 22, can be provided-with circuitry to utilize a satellite positioning system 66 (FIG. 1), such as the Global Positioning System (GPS), to determine, at least in part, its own location in relation to spot beams 30 transmitted from satellites 14 of constellation 12. System 66 includes a constellation of artificial satellites which orbit the earth. System 66 satellites can be the same as or different from satellites 14. In a typical embodiment, the satellites of system 66 are different from satellites 14, but this is not essential.

An MXU, such as MXU 22, utilizes conventional techniques to monitor and process signals transmitted by system 66 to determine its own location, the structure of spot beams 30 transmitted by one or more of satellites 14, and the relationship of satellites 14 to each other. Based on this data, MXU 22 can then calculate which set of beams to monitor for achieving optimum ring alert terminations at any given point in time. Additionally, as was discussed previously with task 62, these beams can be further prioritized based upon the availability of idle transceivers.

Task 68 is an optional task. To better understand the context of this optional task, it will be understood that while the present invention has been described in terms of a system in which ring alert data is broadcast on broadcast channels, other systems can employ separate groups of broadcast channels and ring alert channels. For example, in the IRIDIUM® global telecommunications system, ring alert data is broadcast over separate ring alert channels to the ISUs, while ring alerts to MXUs are sent via the broadcast channel. In optional task 68, prioritization of broadcast channels is accomplished by continuously sampling ISU ring alert channels by a single one or more of idle transceivers 42, 44, and 46, in order to determine the best several MXU broadcast channels to monitor on a continuous basis.

In a preferred embodiment of the present invention, all ISU ring alert channels in a preferred embodiment are sent sequentially on a common frequency. Thus a single transceiver can be used to monitor the signal strengths of each beam's ring alert go by on this single frequency and can therefore inform the other units on a continuous basis (a) which beams have a readable signal and (b) rank order their signal strengths. The results of the signal strength measurements of the ISU ring alert channel can be used to pick which corresponding broadcast channels to monitor for MXU ring alert.

Because the traffic channels in use by in-use transceivers contain handoff candidate lists which are transmitted to the in-use transceivers within the MXU, in task 70 one or more idle transceivers are alternately utilized for monitoring the broadcast channels contained within the candidate handoff list for ring alerts. An "in-use" transceiver is defined herein as one handling voice or data traffic for a system user.

Finally, using the present invention, the number of ring alerts issued from a node of the communications system can be significantly decreased, thereby reducing the power requirements of the node issuing the ring alerts. This is accomplished by controlling the number of beams issued from the node in inverse proportion to the number of broadcast channels the multi-channel unit is monitoring for ring alerts. For example, as the number of broadcast channels being monitored increases (as determined by candidate handoff lists transmitted to the MXUs), the number of ring alerts issued by the node can be reduced.

As a result of the foregoing method steps, or a subset thereof, an MXU ring alert termination is provided in step 72, and the method ends in box 74.

In summary, the present invention provides a system and method which maximize the rate of achieving ring alert terminations in a communication system utilizing a satellite constellation and one or more MXUs operative for achieving call terminations for non-reference communication elements, or ISUs. Because ISUs and MXUs can, and normally are, mobile, the availability of achieving dynamic and increased ring alert terminations by the MXU provides for the enhancement and reliability of the communication system while conserving system resources.

The disclosed system and method utilize idle co-located transceivers of the MXU to monitor a plurality of spot beams in a given environment for ring alerts. The strongest "n" broadcast channels are monitored and prioritized for ring alerts based on signal strength, idle transceiver availability, and a continuous sampling of ring alert data contained within one or more broadcast channels.

Knowledge of system geometries with a satellite positioning system is used to calculate the optimum spot beams to monitor at any one given time. Broadcast channels are prioritized based on the probability that a ring alert can issue over them. And broadcast channels contained within candidate handoff lists (contained within the ring alert channels of in-use transceivers) are monitored and prioritized.

Through use of the present invention, the amount of energy expended by the system in ring alerting MXUs is substantially reduced. As previously discussed, normal ISUs monitor only one beam at a time in order to conserve energy in the ISU. For these users, the system needs to ring enough beams over the area where the ISU is known to be in order to make sure it rings the single beam the ISU happens to be listening to.

Since in the present system the MXUs are monitoring several beams at once, the system can ring fewer beams and still have a net higher ring alert termination rate than that of an ordinary ISU. Fewer ring alerts issued save energy in the satellite and free up message capacity in the SV broadcast channel.

The present invention has been described above with reference to a preferred embodiment. However, those skilled in the art will recognize that changes and modifications can be made in the described embodiments without departing from the nature and scope of the present invention. Various changes and modifications to the embodiment herein chosen for purposes of illustration will readily occur to those skilled in the art.

For example, the MXUs of the present invention could monitor one or more relatively strong, as opposed to the strongest, broadcast channels.

To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method for increasing the probability of call terminations in a communication system, said communication system comprising a plurality of transceivers, including one or more in-use transceivers, comprising the steps of:

providing a plurality of spot beams from a node of a communication system, said plurality of spot beams each containing a plurality of broadcast channels for transmitting ring alert data;

prioritizing said plurality of broadcast channels;

monitoring one or more broadcast channels of handoff candidates taken from traffic data gathered by said one or more in-use transceivers; and with communication system resources, simultaneously monitoring a plurality of broadcast channels within said plurality of spot beams for ring alert data thereby increasing the probability of call terminations.

2. The method of claim 1, wherein said step of prioritizing said plurality of broadcast channels further includes the steps of:

continuously sampling ring alert data for ascertaining optimum ones of said plurality of broadcast channels to monitor; and monitoring said optimum ones of said plurality of broadcast channels.

3. The method of claim 1, wherein said step of prioritizing said plurality of broadcast channels further includes the steps of:

calculating the position of communication system resources relative to said plurality of spot beams; and monitoring said plurality of spot beams based on the position of said communication system resources.

4. The method of claim 1, wherein said step of prioritizing said plurality of broadcast channels further includes the step of prioritizing said plurality of spot beams based on the availability of communication system resources.

5. A method for increasing the probably of call terminations in a communication system, said communication system comprising a plurality of transceivers, including one or more in-use transceivers, comprising the steps of:

providing a plurality of spot beams each containing broadcast channels for transmitting ring alert data;

with a monitoring apparatus, simultaneously monitoring a plurality of strongest broadcast channels within said plurality of spot beams for ring alert data thereby increasing the probability of call terminations;

prioritizing said plurality of strongest broadcast channels; and monitoring one or more of said broadcast channels of handoff candidates taken from traffic data gathered by said one or more in-use transceivers.

6. The method of claim 5, wherein said step of prioritizing said plurality of strongest broadcast channels further includes the steps of:

continuously sampling ring alert data for ascertaining optimum ones of said plurality of strongest broadcast channels to monitor; and monitoring said optimum ones of said plurality of strongest broadcast channels.

7. The method of claim 5, wherein said step of prioritizing said plurality of strongest broadcast channels further includes the steps of:

calculating the position of said monitoring apparatus relative to said plurality of spot beams; and monitoring said plurality of spot beams based on the position of said monitoring apparatus.

8. The method of claim 5, wherein said step of prioritizing said plurality of strongest broadcast channels further includes the step of prioritizing said plurality of spot beams based on the availability of said monitoring apparatus.

9. A method for increasing the probability of call terminations in a multi-channel unit adapted for use in a communication system comprising a plurality of transceivers, including one or more in-use transceivers, said communication system having a node for providing a plurality of spot beams, said spot beams each containing a plurality of broadcast channels for transmitting ring alert data, said method comprising the step of:

with a monitoring apparatus, simultaneously monitoring a plurality of strong broadcast channels within said plurality of spot beams for ring alert data, thereby increasing the probability of call termination;

prioritizing said plurality of strong broadcast channels; and monitoring one or more of said plurality of broadcast channels of handoff candidates taken from traffic data gathered by said one or more in-use transceivers.

10. The method of claim 9, wherein said step of prioritizing said plurality of strong broadcast channels further includes the steps of:

continuously sampling ring alert data for ascertaining optimum ones of said plurality of strong broadcast channels to monitor; and monitoring said optimum ones of said plurality of strong broadcast channels.

11. The method of claim 9, wherein said step of prioritizing said plurality of strong broadcast channels further includes the steps of:

calculating the position of communication system resources relative to said plurality of spot beams; and monitoring said plurality of spot beams based on the position of said monitoring apparatus.

12. The method of claim 9, wherein said step of prioritizing said plurality of strong broadcast channels further includes the step of prioritizing said plurality of spot beams based on the availability of said monitoring apparatus.

13. A method for decreasing the number of ring alerts issued from a node in a communications system comprising a node for providing a plurality of spot beams, said plurality of spot beams each comprising a plurality of broadcast channels for transmitting ring alert data, and a multi-channel unit adapted to monitor ring alerts on more than one broadcast channel, said method comprising the step of:

controlling the number of spot beams issued from said node in inverse proportion to the number of broadcast channels the multi-channel unit is monitoring for ring alerts.

14. The method recited in claim 13, wherein said node transmits the number of broadcast channels to said multi-channel unit in the form of a candidate handoff list.

15. A communication system for increasing the probability of call terminations, comprising:

a node providing a plurality of spot beams, each of said plurality of spot beams containing a plurality of broadcast channels for transmitting ring alert data; and a multi-channel unit having a plurality of co-located transceivers, wherein said plurality of co-located transceivers comprises one or more in-use transceivers and one or more idle transceivers, wherein said one or more idle transceivers monitors one or more of said plurality of broadcast channels of handoff candidates taken from traffic data gathered by said one or more in-use transceivers, and wherein certain ones of said plurality of co-located transceivers simultaneously monitoring a predetermined number of said plurality of spot beams and monitoring a plurality of strongest broadcast channels contained within said plurality of broadcast channels contained within said predetermined number of said plurality of spot beams for ring alert data thereby increasing the probability of call termination.

16. The communication system of claim 15, wherein at least one of said plurality of co-located transceivers continuously samples a plurality of ring alert data for ascertaining the best ones of said plurality of strongest broadcast channels to monitor.

17. The communication system of claim 15, further including a positioning means for calculating the position of said multi-channel unit relative to said plurality of spot beams, said monitoring of said number of said plurality of spot beams by said plurality of co-located transceivers being directly dependent upon the position of said multi-channel unit.

18. The communication system of claim 17, wherein said positioning means includes a global positioning system.

19. The communication system of claim 15, wherein said multi-channel unit is configured to prioritize said plurality of spot beams based on the availability of said plurality of co-located transceivers.

20. A multi-channel unit adapted for use in a communication system having a node for providing a plurality of spot beams, said spot beams containing a plurality of broadcast channels for transmitting ring alert data, said multi-channel unit comprising:

a plurality of transceivers, wherein said plurality of transceivers are co-located and are configured to monitor one or more of said plurality of broadcast channels of handoff candidates taken from traffic data obtained over one or more of said plurality of broadcast channels, and wherein certain ones of said plurality of transceivers simultaneously monitor a predetermined number of said plurality of spot beams and monitor a plurality of strong broadcast channels contained within said plurality of broadcast channels contained within said predetermined number of said plurality of spot beams for ring alert data, thereby increasing the probability of call termination.

21. The multi-channel unit of claim 20, wherein at least one of said plurality of transceivers continuously samples a plurality of ring alert data for ascertaining the best ones of said plurality of strong broadcast channels to monitor.

22. The multi-channel unit of claim 20, further including a positioning means for calculating the position of said multi-channel unit relative to said plurality of spot beams, the monitoring of said number of said plurality of spot beams by said plurality of transceivers being directly dependent upon the position of said multi-channel unit.

23. The multi-channel unit of claim 22, wherein said positioning means includes a global positioning system.

24. The multi-channel unit of claim 20, wherein said multi-channel unit is configured to prioritize said spot beams based on the availability of said plurality of transceivers.

25. The multi-channel unit of claim 20, wherein said node is a satellite orbiting the earth.

* * * * *